United States Patent [19]

Bebinger

[11] 3,768,744
[45] Oct. 30, 1973

[54] FOOD WASTE DISPOSER
[75] Inventor: Jack E. Bebinger, Columbus, Ohio
[73] Assignee: Westinghouse Electric Corporation, Pittsburgh, Pa.
[22] Filed: Dec. 17, 1971
[21] Appl. No.: 209,279

[52] U.S. Cl. .............................................. 241/32.5
[51] Int. Cl. .......................................... B02c 18/42
[58] Field of Search ................... 241/32.5, 46 B, 36, 241/100.5

[56] References Cited
UNITED STATES PATENTS

| 3,084,877 | 4/1963 | Bebinger | 241/46 B |
| 2,979,274 | 4/1961 | Tull | 241/32.5 |
| 3,374,958 | 3/1968 | Shive | 241/32.5 X |
| 3,425,637 | 2/1969 | Enright | 241/32.5 |

Primary Examiner—Donald G. Kelly
Attorney—F. H. Henson et al.

[57] ABSTRACT

A batch type food waste disposer has a rotatable stopper including camming means which engages and moves the actuator of the operating switch inwardly when the stopper is turned to energize the food waste disposer. The rotatable stopper also includes a ledge arrangement which engages beneath laterally projecting portions on the food waste disposer so that the stopper is maintained vertically stationary so food being comminuted by the disposer does not tend to dislodge the stopper or interfere with its actuation of the food waste disposer actuating switch.

4 Claims, 7 Drawing Figures

PATENTED OCT 30 1973

PATENTED OCT 30 1973 3,768,744

FOOD WASTE DISPOSER

BACKGROUND OF THE INVENTION

1. Field of the Invention

This invention relates to switch actuating stoppers and, more particularly, relates to a switch actuating, rotatable stopper for a food waste disposer.

2. Description of the Prior Art

The use of stoppper actuated switches in the food waste disposer is old and well known. Such use includes stoppers which are rotatable so as to cam the food waste disposer actuating switch into an energized condition. However, heretofore these stopper actuated switches have been actuated to closed condition by movement in an outward direction relative to the food waste disposer, proper. Such actuation is hazardous in that it is possible to accidentally actuate the energizing switch of the food waste disposer by the placing of food waste into the unit. Also, accidental brushing of the outwardly actuated switch mechanism by the individual user's hand or arm or by some fairly solid food waste may initiate operation of comminution prior to that time at which it is desired.

Accordingly, it would be desirable to provide a food waste disposer energizing switch which was actuated to energized, closed position upon movement of the switch parts inwardly relative to the food waste disposer so that placing of food scraps and waste within the food waste disposer did not tend to energize the switch prematurely.

One stopper and switch arrangement which provides for this inward actuation is known to be commercially in the marketplace. However, the stopper utilized with the switch is provided with a cam means which moves the switch inwardly as the stopper is moved vertically downwardly relative to the food waste disposer. Engagement of the switch by the stopper, then, requires a fairly precise vertical alignment of the cam means on the stopper with the switch actuating part. This vertical alignment can engender some operating problems by the user. Also, this stopper and switch arrangement provides no positive means which tends to prevent disengagement of the switch and stopper and also, movement of the stopper upwardly due to the fact that some food scraps being comminuted may be tossed upwardly by the comminuting blades. The commercial stopper and switch just referred to provide only a slight wedging action between the stopper and switch which would tend, partially, to limit disengagement therebetween while the food waste disposer was in an operative condition.

It would, therefore, appear to be advantageous to provide a food waste disposer and stopper arrangement in which the operating switch for the food waste disposer is closed by inward movement of a switch actuator and in which the stopper positioning relative to the movement of the switch does not require a precise alignment between portions of the stopper and the switch. It would also be advantageous to provide a stopper which includes a positive arrangement preventing dislodging of the stopper from the switch and the food waste disposer when the food waste disposer is operating.

SUMMARY OF THE INVENTION

The novel food waste disposer stopper and actuating switch disclosed in the instant case contemplates the utilization of an actuating switch which is closed by movement of an actuator or plunger radially inwardly relative to the food waste disposer. The plunger is slidably mounted in the side of the food waste disposer and biased outwardly so that it holds the normally closed switch open except when the plunger is pulled inwardly by the stopper.

The stopper includes an internal cam means which pulls the plunger inwardly upon stopper rotation when the stopper is at a proper level relative to the hopper rim. A ledge on the stopper engages beneath an inwardly-extending lip of the hopper throat when the plunger is pulled in to prevent upward dislodgement of the stopper by the food being ground.

The stopper also includes a groove means into which is inserted an elastomeric gasket member which, when the stopper is lowered beyond a switch actuating level in the hopper throat, seals against the sink flange.

The stopper also includes, disposed adjacent to and adjoining the cam surface, a detent portion which provides a locking relationship between the stopper and plunger so that the stopper is incapable of vibratory rotation to prematurely terminate operation of the food waste disposer.

BRIEF DESCRIPTION OF THE DRAWINGS

For a better understanding of the invention, reference may be had to the preferred embodiment, exemplary of the invention, shown in the accompanying drawings in which.

DETAILED DESCRIPTION OF THE DRAWINGS

Figure 1:
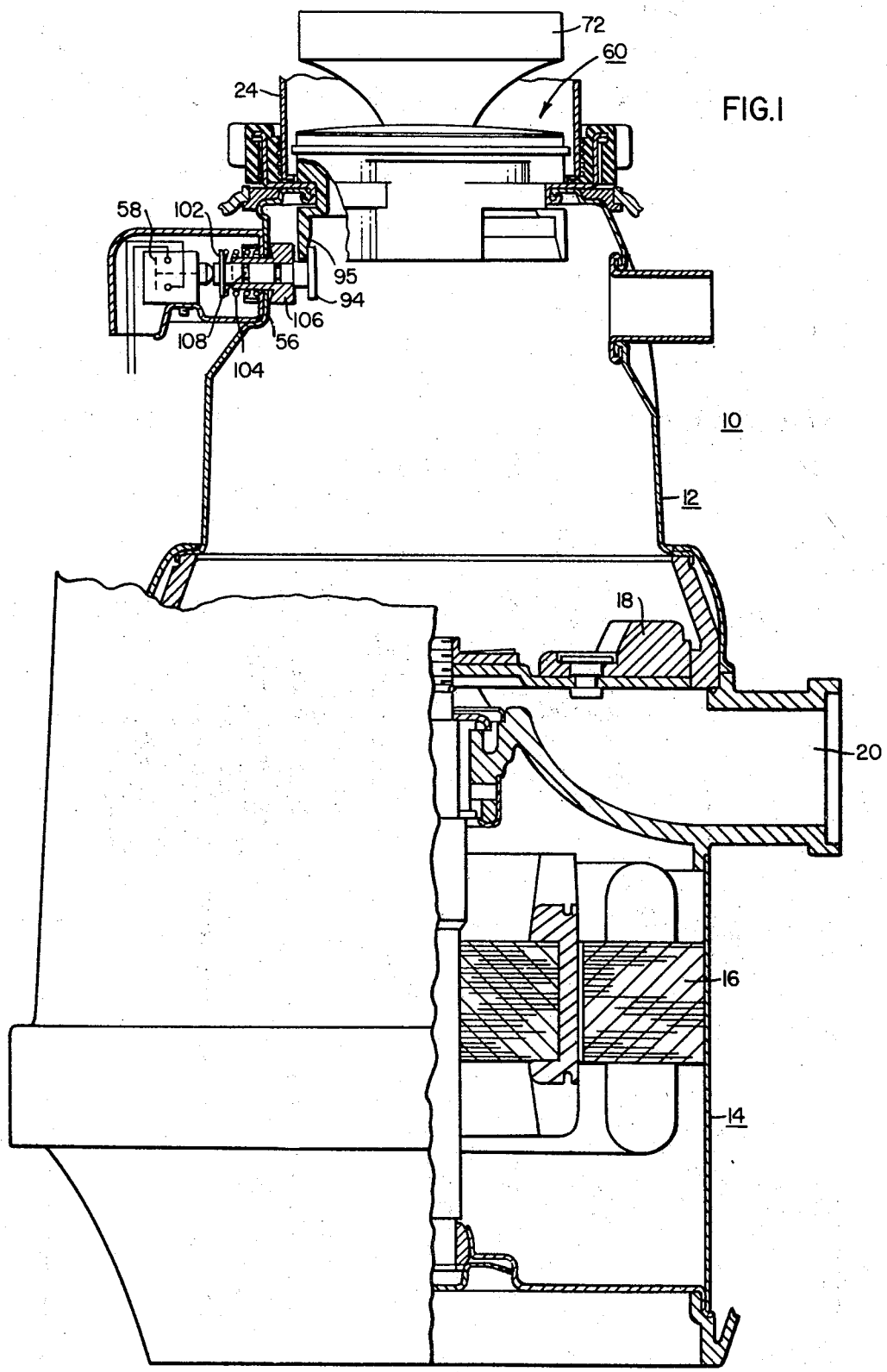
FIG. 1 is a partial cross sectional view of a food waste disposer utilizing the instant invention.

Referring now specifically to FIG. 1, there is shown a food waste disposer 10 with which is utilized the invention of the instant case. The food waste disposer 10 is comprised, generally, of a food waste receiving hopper 12 and a cylindrical housing 14 depending therefrom and within which is disposed a motor 16 that serves as the driving means for a series of comminutor blades 18 that provide for the reduction of food waste placed within the food waste disposed so that the same may be easily drained through a drain 20. The drain 20 is connected to plumbing (not shown) disposed below a sink to which the food waste disposer 10 is connected to receive water.

More specifically, a sink flange 24 is provided having a generally cylindrical shape and a funnel-like opening as is conventional. While the manner in which the disposer is supported from the sink may take any of various forms, the currently preferred way is as disclosed in my U.S. patent application Ser. No. 72,392, now U.S. Pat. No. 3,684,199, to which reference should be had for details relating to the mounting.

Figure 2:
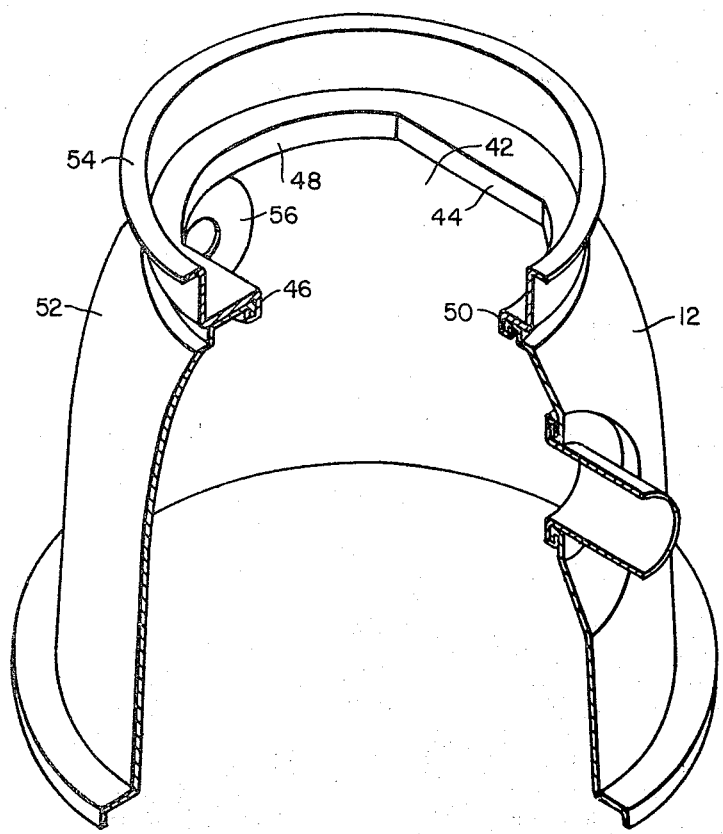
FIG. 2 is a partial perspective view of the hopper of the food waste disposer of FIG. 1.

The hopper 12 of the food waste disposer 10 (FIG. 2) can be seen to include an elongated opening 42 in its top, the same having straight sides 44 and 46 and rounded ends 48 and 50. The shape of the opening 42, as will be seen later, is advantageously utilized in cooperative arrangement with a stopper 60 (FIGS. 1 and 3) of my invention. As is disclosed in my copending U.S. patent application Ser. No. 87,429, now U.S. Pat. No. 3,695,519, the hopper 12 is made up of two separate stainless steel sections 52 and 54 which are rolled together at the opening 42 so as to provide the aforesaid shape. The lower part 52 of the hopper 12 also includes a flattened indented generally circular flat 56 upon which the operating switch 58 (FIG. 1) is mounted. The formation and any additional structure details of the hopper 12 may be obtained by review of the aforesaid patent application so that no further description of the same is offered here.

Turning now to FIGS. 3-7 wherein the rotatable stopper member 60 of the instant invention is illustrated, it can be seen that the upper portion thereof contains a pair of cylindrical sections 62 and 64 separated by a peripheral groove 66 in which is housed an elastomeric gasket 68. The elastomeric gasket 68 is annular in plan view and provides an outwardly-extending engaging portion for the rotatable stopper so that the same may be placed within the opening formed by the sink flange 24 (FIG. 1) with the elastomeric gasket 68 then tightly engaging the inner periphery of the sink flange 24 in the lowermost position of the stopper (below that position in which the stopper is shown in FIG. 1) to provide a water-tight seal between food waste disposer 10 and the sink. Thus, the user of the sink may provide the same with water so that dishes, food or the like may be cleaned in the sink area.

The upper portion of the stopper 60 (FIG. 3) includes, as a portion assembled to it, a slightly dome-shaped thin metallic disk 70 to conform to the top of the rotatable stopper member 60 and which may be chrome plated or the like to provide a pleasing appearance. A handle 72 is also provided for the stopper with the handle including a downwardly depending portion 74 which may abut against the metallic disk 70 when in an assembled condition.

The manner of attaching these three elements together in assembled relationship can be by any conventional means. However, in the embodiment disclosed, the downwardly depending portion 74 of the handle means 72 includes a serrated stub shaft (not shown) which extends through a hole (not shown) in the disk 70 and engages in a correspondingly serrated cylindrical hole in the stopper. A screw 73 is inserted upwardly through the stopper member 60 so as to threadedly engage the serrated stub shaft on the handle means 72 so that these three elements may be tightly fitted together to provide a unitary assembly to insure that rotation of the handle means 72 moves the stopper 60 therewith.

Figures 5, 6:
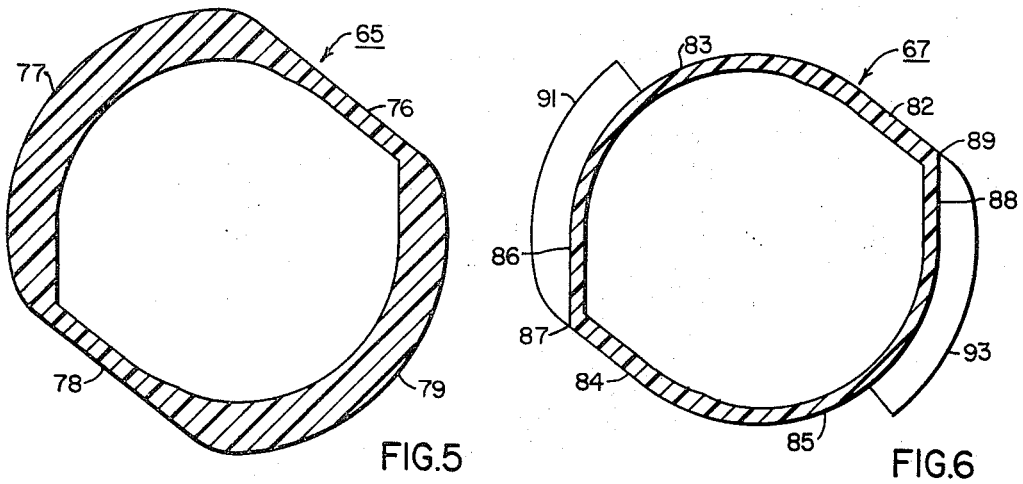
FIG. 5 is a sectional view corresponding to one taken along the line V—V of FIG. 3.
FIG. 6 is a sectional view corresponding to one taken along the line VI—VI of FIG. 3.

The portion of the stopper immediately below cylindrical section 64 is generally designated 65 and its shape is best seen in FIG. 5. This section 65 is symmetrical and includes a pair of flats 76 and 78 located diametrically opposite each other and merging into arcual sides 77 and 79. The exterior shape seen in FIG. 5 conforms to the shape of the throat of the hopper, and does so when the stopper is placed in its lowermost position to provide a seal for the sink.

The portion immediately below the portion 65 is generally designated 67 and its shape is best seen in FIG. 6. This section 67 includes generally diametrically-opposite flat sides 82 and 84 which are in vertical alignment with a part of the length of the flat sides 76 and 78 of next higher section 65 (FIG. 5). The flat sides 82 and 84 merge into arcual portions 83 and 85 which in turn lead to flat sides 86 and 88 adjacent to the flats 82 and 84, and separated therefrom by the corners 87 and 89.

Figure 7:
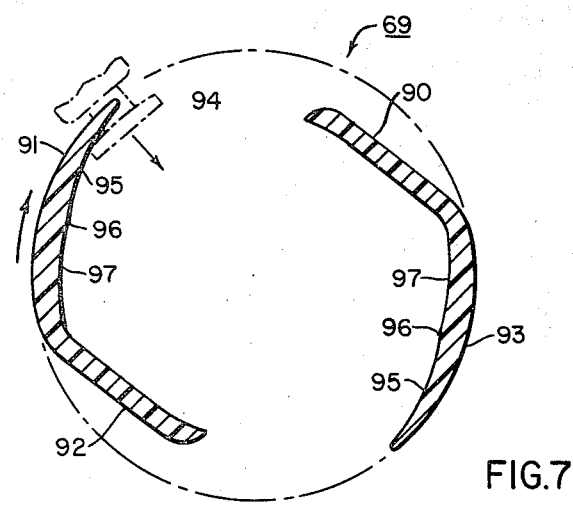
FIG. 7 is a sectional view corresponding to one taken along the line VII—VII of FIG. 3.

The lowermost portion (immediately below portion 67) is generally designated 69 and has a shape in section best seen in FIG. 7. Portion 69 includes generally diametrically-opposite, flat sides 90 and 92 lying in a vertical plane aligned vertically with the plane of the flat sides 82 and 84, respectively, of the portion 67, and with the plane of the flat sides 76 and 78, respectively, of the portion 65. These flat sides 90 and 92 merge into arcual portions 91 and 93 which conform for the extent of their lengths with the arcs of 77 and 79 (FIG. 5) of portion 65. The cam faces for engaging the head of the plunger 94 (shown in dash lines in FIG. 7) are provided on the inner faces of both of the arcual portions 91 and 93. Each cam face includes a tapered face 95 leading to a detent 96, and is followed by a flat face 97. Thus, as the section of FIG. 7 is rotated in a clockwise direction by rotation of the handle of the stopper, one of the cam faces 95 engages the head of the plunger, and progressively draws it inwardly to effect closing of the switch controlling the operation of the disposer. The plunger head rides over the detent 96 and rests, in normal operating condition of the disposer, on the flat 97. Reverse rotation of the stopper of course releases the plunger so that the disposer switch opens.

Figure 3:
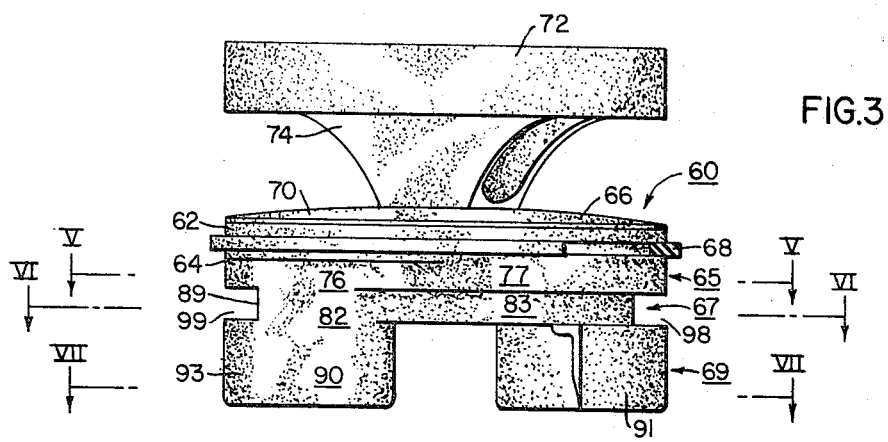
FIG. 3 is a side view of the rotatable stopper of the invention.
Figure 4:
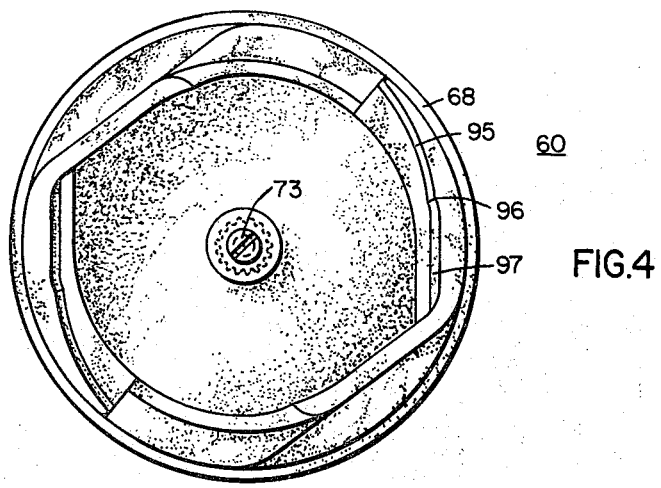
FIG. 4 is a bottom plan view of the stopper.

Now referring to FIG. 3, it may be seen that opposite grooves 98 and 99 are formed between the upper and lower portions 65 and 67 in the area between the arcual portions 77 and 91 on the one side of the stopper, and between 79 and 93 on the other side of the stopper. These grooves will be below the throat of the hopper when the stopper is in its lowermost position, which is its sealing position. Thus, the stopper must be raised sufficiently from a sealed position that the grooves are in the same horizontal plane as the flanges 48-54 (FIG. 2) forming the hopper throat. This raised position of the stopper is that shown in FIG. 1. This raised position of the stopper also moves the gasket 68 up off its seat on the sink flange and, when the stopper is rotated to a switch closed position, there is a sufficient gap between most of the perimeter of portion 67 and the hopper throat for admission of adequate water into the hopper during grinding.

The stopper can only be rotated in a clockwise direction, as viewed from above, when it is at the correct level for rotation and the flat sides are aligned with the straight edges 52 and 54 of the hopper throat, since the straight line distance between corners 87 and 89 (FIG. 6) exceeds the distance between the straight edge portions 52 and 54 of the hopper throat. However, the distance between the arcual portions 83 and 85 in a generally diametric direction is slightly less than the distance between the straight edges 52 and 54, and this permits the stopper to be turned in the noted clockwise direction. The distance between the corners 87 and 89 also serves to prevent rotation of the stopper beyond its normal switch-on position in which the plunger head is engaged by flat face 97 (FIG. 7). In this operating position, the flats 86 and 88 are also parallel to and closely adjacent the straight edges of the hopper throat.

It will be apparent that the stopper, when the disposer is operating, is held against upward disengagement by the interlocking relationship between the straight edges of the hopper throat and the grooves 98 and 99, and is unlikely to be rotated toward a switch-off position by vibration or by being jarred by food being ground, due to the seating of the plunger head against the flat faces 97 past the detents 96.

The stopper can, of course, be used in either of two positions 180° rotated from each other, since all of the sections are symmetrical.

The switch 58 (FIG. 1) is conventional and is arranged to be operated by an actuator or plunger 94 having a head of general disk shape behind which the camming means of the stopper 60 engages. The plunger stem extends through the wall of the hopper 12 and has a retainer ring 102 on its outer end against which a spring 104 bears to bias the plunger outwardly toward a switch open position. The stem of the plunger is slidable in a metallic bushing 106, and has several annular grooves which receive O-rings 108 to provide a water-tight seal. Internal bias means (not shown) is provided within the switch 58 tending to urge the switch button toward the hopper and a switch closed position. Thus, movement of the plunger 94 inwardly by the stopper turns the disposer 10 "on" and initiates the comminution of food waste contained therein.

What is claimed is:
1. A batch type food waste disposer including:
   a hopper with a throat in its upper portion bounded by inwardly-directed flange means defining an opening having opposite straight side edges and arcual end edges;
   a switch for controlling disposer operation mounted outside said hopper and including a switch actuator extending into said hopper below said throat, said actuator having a head thereon;
   a sink stopper including a circular upper portion carrying gasket means and adapted to seat on the top of said throat in one rotative position and the lowermost stopper level to seal said throat, said stopper including successively lower sections having exterior shaped surfaces adapted to be received through said throat when said stopper is in said one rotative position, said stopper having a higher level position to open said seal and permit rotation of said stopper in one direction to a second rotative position, said stopper having a lower end portion including cam means for engaging said head of said actuator to draw said actuator radially inwardly to effect closure of said switch as said stopper is rotated to said second rotative position.

2. A disposer according to claim 1 wherein:
   said stopper includes means at an intermediate level defining generally diametrically-opposite grooves adapted to receive said straight side edges when said stopper is in said second rotative position to prevent vertical disengagement of said stopper from said hopper.

3. A disposer according to claim 1 wherein:
   said lower portion of said stopper includes detent means adjacent said cam means for preventing rotation of said stopper back toward said first rotative position from said second rotative position from vibration and jarring by waste particles being ground.

4. A disposer according to claim 2 including:
   corner means at one end of each of said opposite grooves, said corner means spanning a distance slightly less than the distance between diagonally opposite corners of said throat so that said corner means serve as stops preventing rotation of said stopper in said one direction beyond said second rotative position, and in the opposite direction back beyond said one rotative position.

* * * * *